(12) United States Patent
Ichikawa

(10) Patent No.: US 10,052,963 B2
(45) Date of Patent: Aug. 21, 2018

(54) CONTACTLESS POWER TRANSFER SYSTEM AND METHOD OF CONTROLLING THE SAME

(71) Applicant: TOYOTA JIDOSHA KABUSHIKI KAISHA, Toyota-shi, Aichi-ken (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 15/108,532

(22) PCT Filed: Nov. 12, 2014

(86) PCT No.: PCT/JP2014/005678
§ 371 (c)(1),
(2) Date: Jun. 27, 2016

(87) PCT Pub. No.: WO2015/097968
PCT Pub. Date: Jul. 2, 2015

(65) Prior Publication Data
US 2016/0325632 A1 Nov. 10, 2016

(30) Foreign Application Priority Data

Dec. 25, 2013 (JP) .................................. 2013-267319

(51) Int. Cl.
*H02J 7/00* (2006.01)
*B60L 11/18* (2006.01)
(Continued)

(52) U.S. Cl.
CPC ............ *B60L 11/182* (2013.01); *B60L 11/005* (2013.01); *B60L 11/126* (2013.01);
(Continued)

(58) Field of Classification Search
CPC ....................................................... H02J 7/025
(Continued)

(56) References Cited

U.S. PATENT DOCUMENTS 7,741,734 B2   6/2010   Joannopoulos et al.
2007/0222542 A1   9/2007   Joannopoulos et al.
(Continued)

FOREIGN PATENT DOCUMENTS

AU   2006269374 B2   1/2007
AU   2007349874 A2   10/2008
(Continued)

*Primary Examiner* — Edward Tso
*Assistant Examiner* — Ahmed Omar
(74) *Attorney, Agent, or Firm* — Oliff PLC

(57) ABSTRACT

An electric power reception control unit of a vehicle generates an electric power transmission command for adjusting received electric power to an electric power reception command. The generated electric power transmission command is transmitted from the vehicle to a charging station via radio communication. An electric power transmission control unit of the charging station adjusts transmission electric power, which is transmitted from the charging station to the vehicle, to the electric power transmission command received from the vehicle. Responsiveness of electric power reception control carried out in the electric power reception control unit is lower than responsiveness of electric power transmission control carried out in the electric power transmission control unit.

7 Claims, 10 Drawing Sheets

(51) Int. Cl.

| | |
|---|---|
| *H02J 50/90* | (2016.01) |
| *H02J 50/40* | (2016.01) |
| *B60L 11/00* | (2006.01) |
| *B60L 11/12* | (2006.01) |
| *H02J 17/00* | (2006.01) |
| *H02J 50/80* | (2016.01) |
| *H02J 50/12* | (2016.01) |
| *H02J 7/02* | (2016.01) |

(52) U.S. Cl.
CPC ....... *B60L 11/1803* (2013.01); *B60L 11/1824* (2013.01); *B60L 11/1833* (2013.01); *B60L 11/1835* (2013.01); *B60L 11/1838* (2013.01); *B60L 11/1846* (2013.01); *B60L 11/1861* (2013.01); *H02J 7/025* (2013.01); *H02J 17/00* (2013.01); *H02J 50/12* (2016.02); *H02J 50/40* (2016.02); *H02J 50/80* (2016.02); *H02J 50/90* (2016.02); *B60L 2210/10* (2013.01); *B60L 2210/30* (2013.01); *B60L 2210/40* (2013.01); *B60L 2230/14* (2013.01); *B60L 2230/16* (2013.01); *B60L 2240/527* (2013.01); *B60L 2240/529* (2013.01); *B60L 2240/80* (2013.01); *B60L 2250/10* (2013.01); *B60L 2250/16* (2013.01); *Y02T 10/6217* (2013.01); *Y02T 10/7005* (2013.01); *Y02T 10/705* (2013.01); *Y02T 10/7022* (2013.01); *Y02T 10/7044* (2013.01); *Y02T 10/7072* (2013.01); *Y02T 10/7077* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
USPC .......................................................... 320/108
See application file for complete search history.

(56) References Cited

U.S. PATENT DOCUMENTS

| | | |
|---|---|---|
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0062966 A1* | 3/2013 | Verghese ................ H02J 7/025 307/104 |
| 2013/0127409 A1 | 5/2013 | Ichikawa |
| 2013/0162051 A1 | 6/2013 | Michihata et al. |
| 2013/0193749 A1 | 8/2013 | Nakamura et al. |
| 2015/0008877 A1 | 1/2015 | Ichikawa et al. |
| 2016/0214488 A1 | 7/2016 | Okamoto |

FOREIGN PATENT DOCUMENTS

| | | |
|---|---|---|
| AU | 2010200044 A1 | 1/2010 |
| AU | 2006269374 C1 | 3/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2008-283789 A | 11/2008 |
| JP | 2009-501510 A | 1/2009 |
| JP | 2013-110822 A | 6/2013 |
| JP | 2013-126327 A | 6/2013 |
| JP | 2013-138526 A | 7/2013 |
| JP | 2013-146148 A | 7/2013 |
| JP | 2013-146154 A | 7/2013 |
| JP | 2013-154815 A | 8/2013 |
| JP | 2013-225962 A | 10/2013 |
| JP | 2015-089221 A | 5/2015 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2015/045058 A1 | 4/2015 |

* cited by examiner

CONTACTLESS POWER TRANSFER SYSTEM AND METHOD OF CONTROLLING THE SAME

TECHNICAL FIELD

The present invention relates to a contactless power transfer system and a method of controlling the contactless power transfer system, and particularly to a contactless power transfer system for transferring electric power from a charging station to a vehicle in a contactless manner, and a method of controlling the contactless power transfer system.

BACKGROUND ART

Japanese Patent Laying-Open No. 2013-225962 (PTL 1) discloses a contactless power transfer system for transferring, in a contactless manner, electric power from a power feeding device provided on the ground side to a power reception device mounted in a vehicle. In the contactless power transfer system, the power feeding device and the power reception device are in a contactless state. Also for exchanging information between the power feeding device and the power reception device, information including received electric power, a voltage of received electric power, a current of received electric power and the like in the power reception device is transmitted by a radio communication device from the power reception device to the power feeding device (see PTL 1).

CITATION LIST

Patent Literature

[PTL 1] Japanese Patent Laying-Open No. 2013-225962
[PTL 2] Japanese Patent Laying-Open No. 2013-138526
[PTL 3] Japanese Patent Laying-Open No. 2013-154815
[PTL 4] Japanese Patent Laying-Open No. 2013-146154
[PTL 5] Japanese Patent Laying-Open No. 2013-146148
[PTL 6] Japanese Patent Laying-Open No. 2013-110822
[PTL 7] Japanese Patent Laying-Open No. 2013-126327

SUMMARY OF INVENTION

Technical Problem

When a failure such as communication blackout occurs in radio communication between the power feeding device and the power reception device, the information about power transfer becomes unable to be exchanged. Accordingly, it is generally conceivable to stop power transfer. Also in the case of a momentary communication failure that can be recovered in a short time, however, when power transfer is stopped whenever such a communication failure occurs, there may frequently occur such a case that desired power transfer does not complete as a result.

The present invention has been made to solve the above-described problems. An object of the present invention is to provide a contactless power transfer system capable of suppressing that power transfer is stopped by a communication failure occurring between the power-transmission side and the power-reception side, and a method of controlling the contactless power transfer system.

Solution to Problem

According to the present invention, a contactless power transfer system includes a charging station and a vehicle configured to be capable of receiving electric power from the charging station in a contactless manner. The charging station includes a power transmission device configured to transmit electric power to the vehicle in a contactless manner, a first control device configured to control the power transmission device, and a first communication device configured to communicate with the vehicle. The vehicle includes a power reception device configured to receive, in a contactless manner, electric power output from the power transmission device, a second control device configured to control the power reception device, and a second communication device configured to communicate with the charging station. The second control device generates an electric power transmission command for adjusting an amount of received electric power in the power reception device to a prescribed target, and causes the second communication device to transmit the electric power transmission command to the charging station. The amount of received electric power is preferably received electric power, but may be a voltage of received electric power or a current of received electric power. The first control device controls the power transmission device so as to adjust transmission electric power output from the power transmission device to the electric power transmission command received by the first communication device. Responsiveness of electric power reception control, which is carried out by the second control device, for adjusting the amount of received electric power is lower than responsiveness of electric power transmission control, which is carried out by the first control device, for adjusting the transmission electric power.

According to this contactless power transfer system, the electric power transmission command is generated during electric power reception control carried out by the second control device of the vehicle, and transmitted by the second communication device to the charging station. In this case, the responsiveness of the electric power reception control is lower than the responsiveness of the electric power transmission control carried out by the first control device of the charging station. Accordingly, in the case of a short-time communication failure, the electric power transmission control is less influenced by the fact that the update value of the electric power transmission command generated in the second control device is not transmitted to the first control device. If the electric power transmission control is less influenced, it is not necessary to stop power transfer from the charging station to the vehicle. Therefore, according to this contactless power transfer system, it becomes possible to suppress that power transfer is stopped by a communication failure occurring between the charging station and the vehicle.

Preferably, the first control device carries out first feedback control based on a detected value of the transmission electric power. The second control device carries out second feedback control based on a detected value of the amount of received electric power. The second feedback control is longer in control cycle than the first feedback control.

By such a configuration, even when a communication failure occurs between the charging station and the vehicle, if this communication failure is a short-time communication failure that is recovered during one control cycle of the second feedback control, this communication failure does not exert an influence upon electric power transmission control. Therefore, according to this contactless power transfer system, it becomes possible to suppress that power transfer is stopped by a communication failure.

Preferably, a time constant of the electric power reception control carried out by the second control device is greater than a time constant of the electric power transmission control carried out by the first control device.

By such a configuration, the responsiveness of the electric power reception control is lower than the responsiveness of the electric power transmission control. Therefore, also according to this contactless power transfer system, it becomes possible to suppress that power transfer is stopped by a communication failure.

Preferably, a transmission cycle of the electric power transmission command transmitted by the second communication device is longer than a control cycle of the electric power transmission control carried out by the first control device.

By such a configuration, even when a communication failure occurs between the charging station and the vehicle, if this communication failure is a short-time communication failure that is recovered during the transmission cycle of the electric power transmission command, this communication failure does not exert an influence upon electric power transmission control. Therefore, according to this contactless power transfer system, it becomes possible to suppress that power transfer is stopped by a communication failure.

Preferably, the first control device causes the first communication device to transmit, to the vehicle, a signal indicating that the transmission electric power has converged to the electric power transmission command. When the signal has been received by the second communication device, the second control device updates the electric power transmission command transmitted to the charging station by the second communication device.

According to this contactless power transfer system, after it is confirmed on the vehicle side that the transmission electric power has converged to the electric power transmission command, the electric power transmission command transmitted from the vehicle to the charging station is updated. Accordingly, it is not necessary to uniformly lower the responsiveness of the electric power reception control in consideration of the convergence of electric power transmission control in the case where the changed amount of the electric power transmission command is relatively large. Therefore, according to this contactless power transfer system, the responsiveness of the electric power reception control can be improved while ensuring the stability of the entire control.

Preferably, the second control device updates, for each prescribed cycle, the electric power transmission command transmitted to the charging station by the second communication device. The first control device stops changing of the electric power transmission command in the electric power transmission control until the transmission electric power converges to the electric power transmission command.

Also according to this contactless power transfer system, since convergence of the transmission electric power is confirmed, it is not necessary to uniformly lower the responsiveness of the electric power reception control. Then, in this contactless power transfer system, it is not necessary to transmit the signal indicating convergence of the transmission electric power from the charging station to the vehicle. Therefore, according to this contactless power transfer system, it becomes possible to improve the responsiveness of the electric power reception control while ensuring the stability of the entire control in a simple configuration.

Furthermore, according to the present invention, a control method is a method of controlling a contactless power transfer system in which electric power is transferred from a charging station to a vehicle in a contactless manner. The method includes the steps of: generating an electric power transmission command for adjusting an amount of received electric power in the vehicle to a prescribed target, and transmitting the electric power transmission command from the vehicle to the charging station; and adjusting, in the charging station, transmission electric power output to the vehicle to the electric power transmission command received from the vehicle. Responsiveness of electric power reception control for adjusting the amount of received electric power is lower than responsiveness of electric power transmission control for adjusting the transmission electric power.

According to this control method, the responsiveness of the electric power reception control is lower than the responsiveness of the electric power transmission control. Accordingly, in the case of a short-time communication failure, an influence caused by not transmitting the update value of the electric power transmission command from the vehicle to the charging station is relatively small. If an influence upon the electric power transmission control is relatively small, power transfer from the charging station to the vehicle does not need to be stopped. Therefore, according to this method of controlling a contactless power transfer system, it becomes possible to suppress that power transfer is stopped by a communication failure occurring between the charging station and the vehicle.

Advantageous Effects of Invention

According to the present invention, in a contactless power transfer system including a charging station and a vehicle configured to be capable of receiving electric power from the charging station in a contactless manner, it becomes possible to suppress that power transfer is stopped by a communication failure occurring between the charging station and the vehicle.

DESCRIPTION OF EMBODIMENTS

Figure 1:
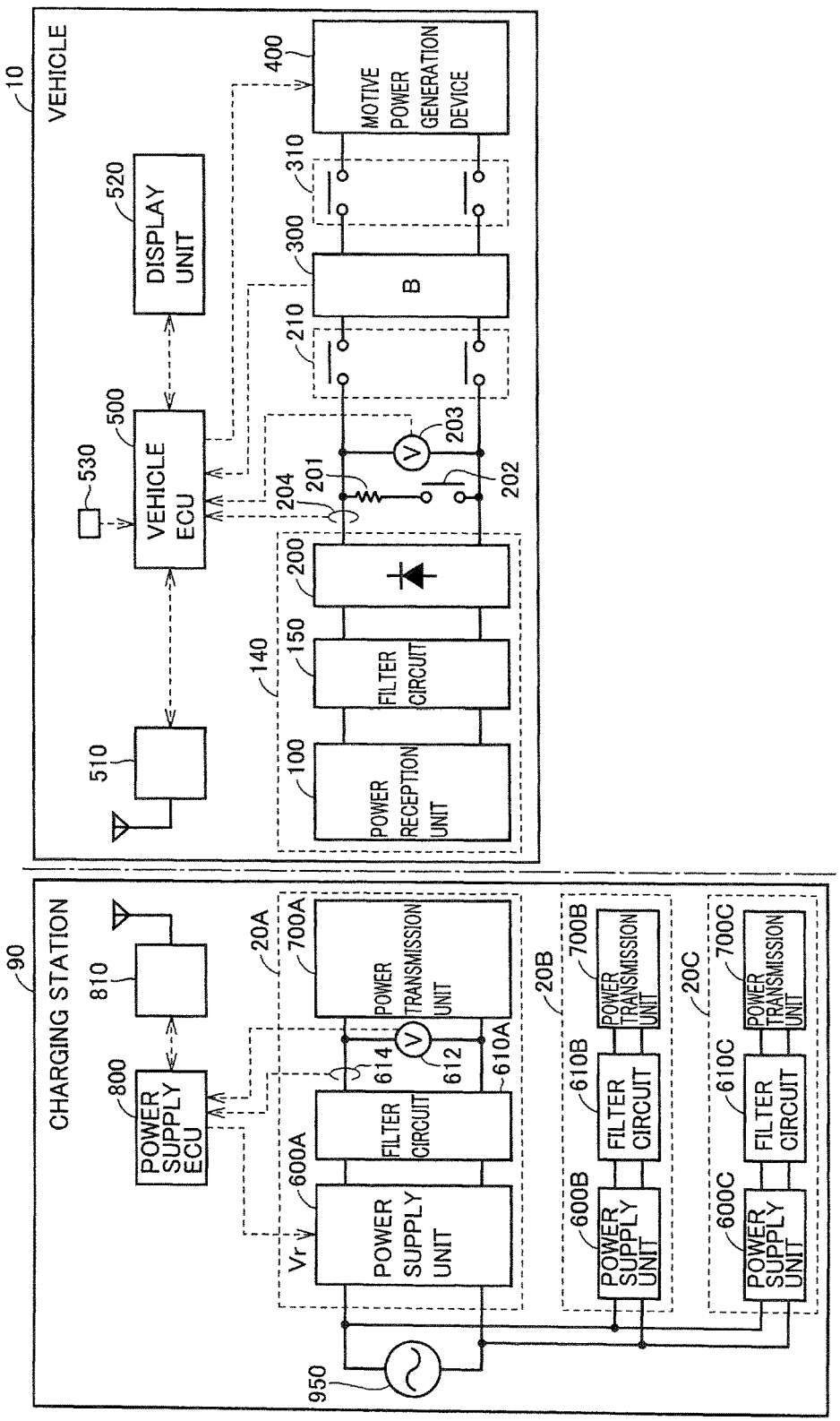
FIG. 1 is an entire configuration diagram of a contactless power transfer system according to an embodiment of the present invention.

The embodiments of the present invention will be hereinafter described in detail with reference to the accompanying drawings, in which the same or corresponding components are designated by the same reference characters, and description thereof will not be repeated.

First Embodiment (Description of Outline of Contactless Power Transfer System)

Figure 2:
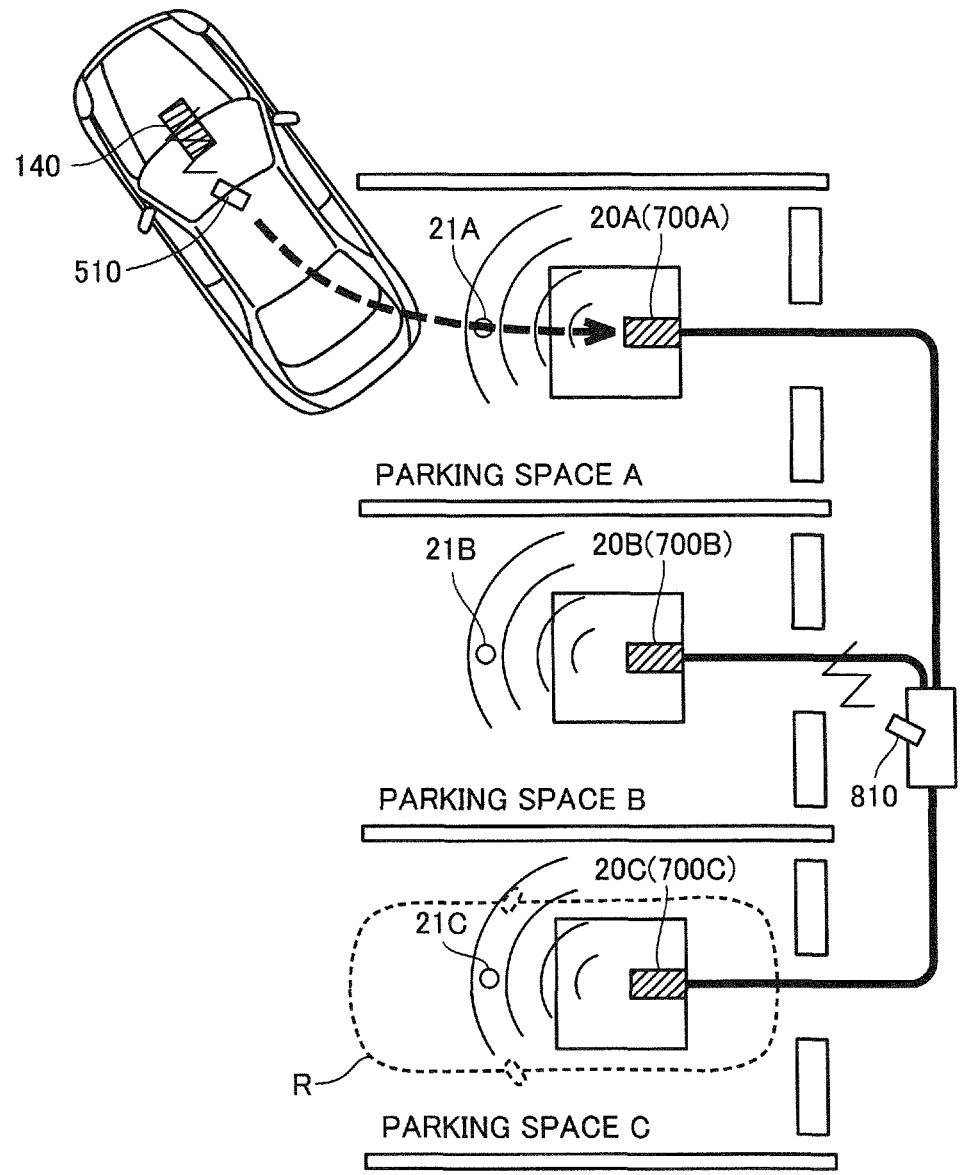
FIG. 2 is a diagram for illustrating the state where a vehicle is being parked at a parking position within a charging station.

FIG. 1 is an entire configuration diagram of a contactless power transfer system according to an embodiment of the present invention. FIG. 2 is a diagram for illustrating the state where a vehicle is being parked at a parking position within a charging station. First, referring to FIGS. 1 and 2, the outline about the contactless power transfer system according to the present embodiment will be hereinafter described.

Referring to FIGS. 1 and 2, the contactless power transfer system according to the present embodiment includes a vehicle 10 and a charging station 90. Charging station 90 includes a communication unit 810, parking spaces A to C, and power transmission units 700A to 700C provided within parking spaces A to C, respectively. A "vehicle parking region R" in FIG. 2 shows a region in which vehicle 10 is located at the time when vehicle 10 is parked such that power reception unit 100 of vehicle 10 faces any one of power transmission units 700A to 700C of charging station 90.

Although FIG. 2 shows a vehicle parking region related to power transmission unit 700C of power transmission device 20C, power transmission units 700A and 700B of power transmission devices 20A and 20B each include a vehicle parking region, as a matter of course.

Communication unit 810 can transmit a signal so as to reach the inside and the outside of vehicle parking region R. Specifically, the signal transmission area of communication unit 810 falls within, for example, a range of 5 m radius to 10 m radius with communication unit 810 defined as the center.

In other words, communication unit 810 transmits a signal not only to the inside of parking spaces A to C but also to the position that is several meters away from parking spaces A to C. If vehicle 10 is located inside of parking space A, B or C or located within the range of several meters away from parking space A, B or C, vehicle 10 can receive the signal from charging station 90.

Vehicle 10 includes a communication unit 510 capable of transmitting a signal not only from the inside of the parking space but also from the outside of parking spaces A to C (for example, the position that is approximately 5 m to 10 m away) to charging station 90 so as to allow charging station 90 to receive the signal; a power reception unit 100 configured to be capable of receiving electric power from power transmission units 700A to 700C in a contactless manner; a display unit 520 for informing the user of the relative positional relationship between power reception unit 100 and each of power transmission units 700A to 700C; and a control unit (a vehicle ECU 500) controlling communication unit 510, power reception unit 100 and display unit 520.

Preferably, charging station 90 includes sensors 21A to 21C provided within parking spaces A to C, respectively. Sensors 21A to 21C detect existence or nonexistence of the vehicle that is parked within parking spaces A to C, respectively. When charging station 90 determines based on the outputs from sensors 21A to 21C that the vehicle is not parked in at least one of parking spaces A to C, charging station 90 issues, to the surroundings, a broadcast signal informing that it can transmit electric power. On the other hand, when charging station 90 determines based on the outputs from sensors 21A to 21C that vehicles are parked in all of parking spaces A to C, charging station 90 does not issue the above-described broadcast signal to the surroundings. Consequently, vehicle 10 is to be guided into charging station 90 when a parking space is vacant.

When vehicle 10 receives the above-described broadcast signal from charging station 90, it issues, to the surroundings, a signal requesting an output of electric power for position confirmation for aligning vehicle 10 with a parking space. It is to be noted that the electric power for position confirmation means electric power output from charging station 90 at the time when vehicle 10 is aligned with a parking space. Vehicle 10 is aligned based on the voltage of received electric power at the time when vehicle 10 receives this electric power for position confirmation. It is to be noted that the above-described request signal is sent so as to reach the range of approximately 5 m to 10 m from vehicle 10 defined as the center. Accordingly, charging station 90 can receive the request signal even if vehicle 10 is located on the outside of parking spaces A to C.

When charging station 90 receives the above-described request signal, charging station 90 supplies electric power for position confirmation at least to any power transmission units corresponding to vacant spaces of parking spaces A to C. Then, based on the voltage of received electric power generated by the electric power received in power reception unit 100, vehicle ECU 500 causes display unit 520 to display the positional relationship between power reception unit 100 and one of power transmission units 700A to 700C. By such a configuration, power transfer can be actually carried out between the power transmission unit and the power reception unit, to allow positional alignment to be achieved in accordance with the result, so that vehicle 10 can be reliably charged.

Preferably, vehicle 10 includes a contactless charging switch 530 operated by the user. When vehicle 10 receives the above-described broadcast signal at the time when contactless charging switch 530 is ON, it issues the above-described request signal requesting an output of the electric power for position confirmation to the surroundings. By such a configuration, for example, when the user wants to carry out charging, contactless charging switch 530 is turned ON, so that alignment between the power reception unit and the power transmission unit can be implemented based on the voltage of received electric power.

Preferably, when alignment between power reception unit 100 and one of power transmission units 700A to 700C of charging station 90 is completed, vehicle ECU 500 performs a pairing process between this vehicle ECU 500 itself and charging station 90 for causing charging station 90 to identify one of power transmission units 700A to 700C that has been aligned with power reception unit 100. By this pairing process, even when charging station 90 having a plurality of power transmission units 700A to 700C is used, the power transmission unit having been subjected to alignment can be identified.

Preferably, the above-described pairing process includes a process of transmitting electric power in a plurality of different patterns from power transmission units 700A to 700C; and transmitting a signal, which corresponds to the pattern in which power reception unit 100 has received electric power, from communication unit 510 to communication unit 810.

Figure 5:
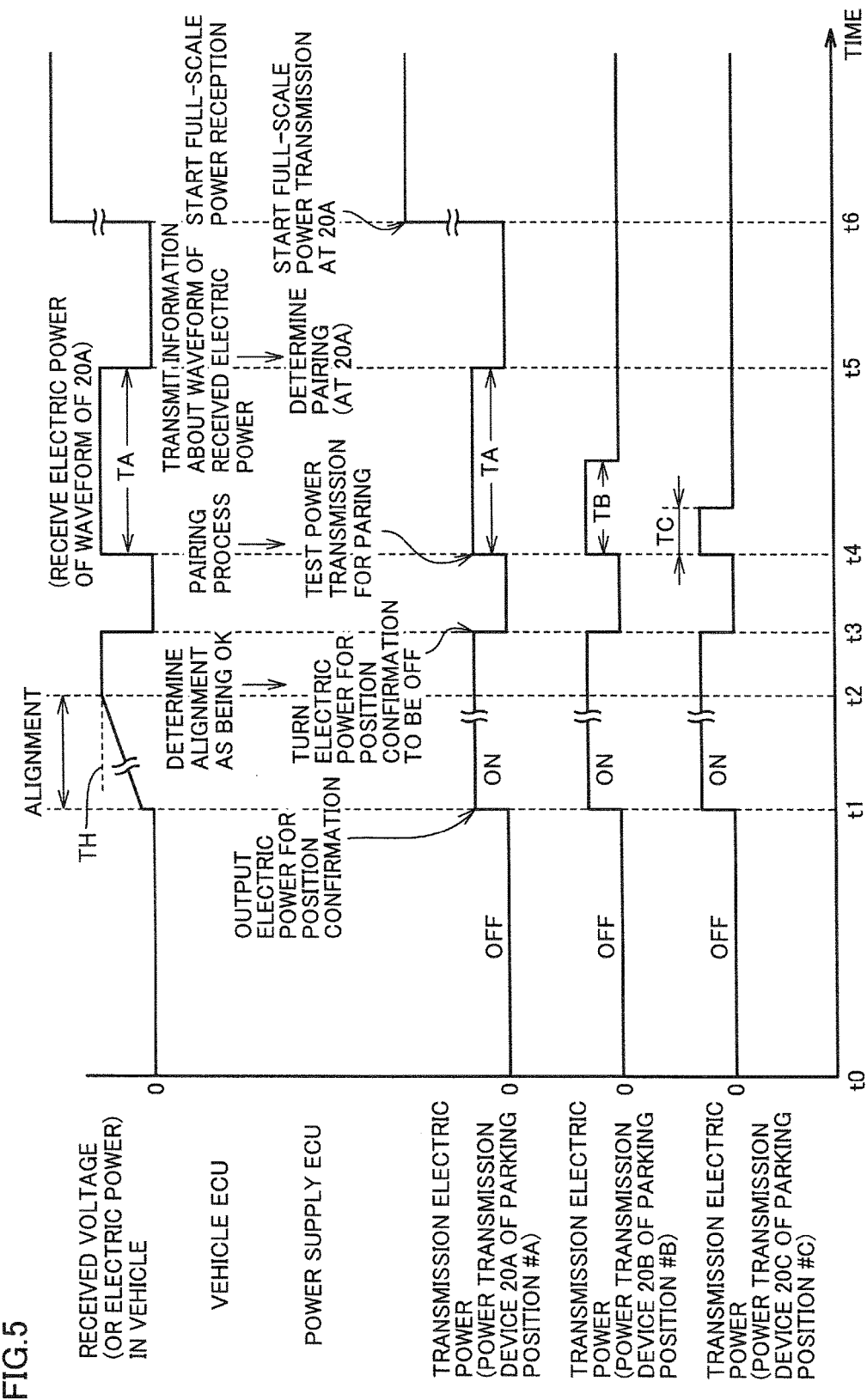
FIG. 5 is a timing chart showing changes in transmission electric power and a voltage of received electric power that change in the course of the process in FIG. 4.
Figure 10:
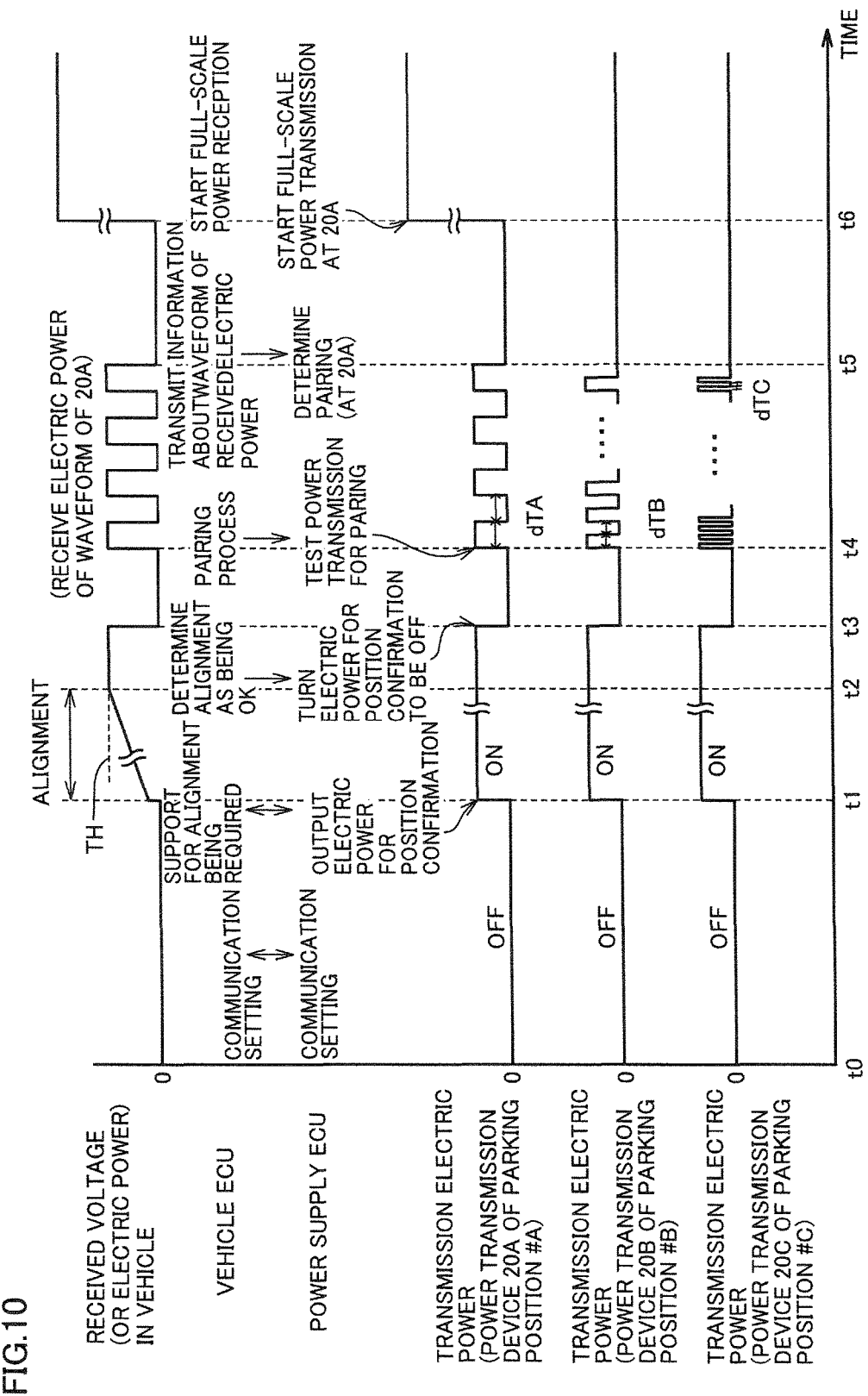
FIG. 10 is a diagram for illustrating a modification of a pairing process.

More preferably, in the case where electric power is transmitted in a plurality of patterns, electric power is transmitted at different power transmission times during a prescribed time period (FIG. 5). Alternatively, in the case where electric power is transmitted in a plurality of patterns, electric power may be transmitted such that power transmission is repeatedly turned ON or OFF in different patterns during a prescribed time period (FIG. 10).

When the alignment and the pairing process between charging station 90 and vehicle 10 are completed, the full-scale power transfer process for charging power storage device 300 of vehicle 10 is carried out. Specifically, in vehicle ECU 500 of vehicle 10, electric power reception control is carried out such that the received electric power (which may be a voltage of received electric power or a current of received electric power) reaches a desired target value. Then, power storage device 300 is charged. In electric power reception control, a target value of the transmission electric power (electric power transmission command) from charging station 90 is generated such that the received electric power becomes equal to the target value, and then, transmitted by communication unit 510 to charging station 90.

In a power supply ECU 800 of charging station 90, electric power transmission control based on the electric power transmission command from vehicle 10 received by communication unit 810 is carried out, and the transmission electric power to be output to vehicle 10 from the power transmission device having been identified by pairing is adjusted to an electric power transmission command. In electric power transmission control, the transmission electric power is adjusted so as to become equal to the electric power transmission command, and the transmission electric power adjusted based on the electric power transmission command is transmitted to vehicle 10.

In this case, the responsiveness of the electric power reception control carried out in vehicle ECU 500 is designed to be lower than the responsiveness of the electric power transmission control carried out in power supply ECU 800. By way of example, the responsiveness of the electric power reception control is designed to be approximately 1/10 of the responsiveness of the electric power transmission control. By designing the responsiveness of each of electric power reception control and electric power transmission control in this way, if a communication failure occurring between communication units 510 and 810 is a short-time communication failure, it becomes possible to suppress an influence exerted by carrying out the electric power transmission control in the state where the electric power transmission command, which has been changed in electric power reception control, is not transmitted to the electric power transmission control side. In particular, in the case where a communication failure is resolved before the electric power transmission command is updated by electric power reception control, it becomes possible to eliminate an influence exerted by this communication failure upon the electric power transmission control.

Preferably, the electric power reception control carried out in vehicle ECU 500 is implemented by feedback control based on the detected value of the received electric power, while the electric power transmission control carried out in power supply ECU 800 is implemented by feedback control based on the detected value of the transmission electric power. Also, the control cycle of the feedback control constituting the electric power reception control is longer than the control cycle of the feedback control constituting the electric power transmission control. Accordingly, even if a communication failure occurs between communication units 510 and 810, when this communication failure is resolved within the control cycle of the feedback control constituting the electric power reception control, it becomes possible to eliminate an influence exerted by this communication failure upon the electric power transmission control.

Preferably, the cycle of transmitting the electric power transmission command, which is generated in vehicle ECU 500, to vehicle 10 by communication unit 810 is longer than the control cycle of the electric power transmission control carried out in power supply ECU 800. Accordingly, even if a communication failure occurs between communication units 510 and 810, when this communication failure is resolved within the transmission cycle of the electric power transmission command, it becomes possible to eliminate an influence exerted by this communication failure upon the electric power transmission control.

Then, details of each configuration of the contactless power transfer system will be hereinafter further described.

(Detailed Configuration of Contactless Power Transfer System)

Referring to FIG. 1, the contactless power transfer system of the present embodiment is formed of a vehicle 10 equipped with a power reception device 140 configured to be capable of receiving electric power in a contactless manner; and a charging station 90 including power transmission devices 20A, 20B and 20C transmitting electric power from outside the vehicle to power reception unit 100.

Vehicle 10 includes a power reception device 140, a power storage device 300, a motive power generation device 400, a vehicle ECU 500, a communication unit 510, a display unit 520, and a contactless charging switch 530. Power reception device 140 includes a power reception unit 100, a filter circuit 150 and a rectification unit 200. Also, vehicle 10 further includes a resistance 201, a relay 202, a voltage sensor 203, a current sensor 204, and relays 210 and 310.

Charging station 90 includes an external power supply 950, power transmission devices 20A, 20B and 20C, a power supply ECU 800, and a communication unit 810. Power transmission devices 20A, 20B and 20C include power supply units 600A, 600B and 600C, filter circuits 610A, 610B and 610C, and power transmission units 700A, 700B and 700C, respectively. Each of power transmission devices 20A, 20B and 20C further includes a voltage sensor 612 and a current sensor 614 (which are not shown for power transmission devices 20B and 20C).

For example, as shown in FIG. 2, power transmission devices 20A, 20B and 20C are disposed on the surface of the ground or in the ground of parking spaces A, B and C, respectively, while power reception device 140 is disposed in the lower part of the vehicle body. It is to be noted that the position of power reception device 140 to be placed is not limited to this. For example, when power transmission devices 20A, 20B and 20C are disposed above vehicle 10, power reception device 140 may be disposed in the upper part of the vehicle body.

Power reception unit 100 includes a resonance circuit for receiving, in a contactless manner, electric power (alternating current) output from any one of power transmission units 700A, 700B and 700C of power transmission devices 20A, 20B and 20C. The resonance circuit is formed of a coil and a capacitor. When a desired resonant condition is obtained only by a coil, a capacitor does not have to be provided. Power reception unit 100 outputs the received electric power to rectification unit 200. Rectification unit 200 rectifies the AC (alternating-current) power received by power reception unit 100, and outputs the rectified AC power to power storage device 300. Filter circuit 150 is provided between power reception unit 100 and rectification unit 200, and suppresses the harmonic noise generated during power reception. Filter circuit 150 is configured by an LC filter including an inductor and a capacitor, for example.

Power storage device 300 is a rechargeable DC (direct-current) power supply and is configured of a secondary battery such as a lithium-ion battery or a nickel-metal hydride battery, for example. The voltage of power storage device 300 is, for example, approximately 200V. Power storage device 300 stores the electric power output from rectification unit 200, and also stores the electric power generated by motive power generation device 400. Then, power storage device 300 supplies the stored electric power to motive power generation device 400. It is to be noted that a large capacity capacitor can also be employed as power storage device 300. Although not particularly shown, a DC-DC converter adjusting the output voltage of rectification unit 200 may be provided between rectification unit 200 and power storage device 300.

Motive power generation device 400 generates driving power for running of vehicle 10 using the electric power stored in power storage device 300. Although not particularly shown, motive power generation device 400, for example, includes an inverter receiving electric power from power storage device 300, a motor driven by the inverter, driving wheels driven by the motor, and the like. In addition, motive power generation device 400 may also include a power generator for charging power storage device 300 and an engine capable of driving the power generator.

Vehicle ECU 500 includes a CPU (Central Processing Unit), a storage device, an input/output buffer, and the like (each of which is not shown). This vehicle ECU 500 inputs the signals from various sensors and outputs the control signal to each device while controlling each device in vehicle 10. By way of example, vehicle ECU 500 performs running control of vehicle 10, and charging control of power storage device 300. It is to be noted that the above-described control is not limited to the process by software, but can be carried out by dedicated hardware (an electronic circuit).

Furthermore, as main control carried out by vehicle ECU 500, vehicle ECU 500 carries out electric power reception control for adjusting the received electric power in vehicle 10 to a prescribed target during charging of power storage device 300 by charging station 90. Specifically, vehicle ECU 500 generates an electric power transmission command indicating the target of the transmission electric power output from charging station 90 such that the received electric power becomes equal to the target. Then, vehicle ECU 500 controls communication unit 510 so as to transmit the generated electric power transmission command to charging station 90.

In addition, relay 210 is provided between rectification unit 200 and power storage device 300. Relay 210 is turned ON by vehicle ECU 500 during charging of power storage device 300 by power transmission devices 20A, 20B and 20C. Furthermore, system main relay (SMR) 310 is provided between power storage device 300 and motive power generation device 400. SMR 310 is turned ON by vehicle ECU 500 when startup of motive power generation device 400 is requested.

Furthermore, resistance 201 is provided across the power line pair between rectification unit 200 and relay 210, and relay 202 is connected in series to resistance 201. Voltage sensor 203 detects the output voltage of rectification unit 200, and outputs the detected value to vehicle ECU 500. Current sensor 204 detects the output current of rectification unit 200, and outputs the detected value to vehicle ECU 500. Based on the detected values in voltage sensor 203 and current sensor 204, the received electric power in vehicle 10 can be detected.

Communication unit 510, which is configured to be capable of performing radio communication with communication unit 810 of charging station 90, transmits the electric power transmission command generated in vehicle ECU 500 to charging station 90, and also, exchanges information including start/stop of power transfer, the power receiving conditions of vehicle 10 and the like with communication unit 810.

Referring to FIGS. 1 and 2, in accordance with a vehicle-mounted camera (not shown), the strength and the like in vehicle 10 of receiving electric power for position confirmation output from power transmission unit 700A, vehicle 10 or charging station 90 determines whether the position of power reception unit 100 of vehicle 10 is aligned with power transmission unit 700A of power transmission device 20A. Then, the user is informed of the determination result on display unit 520. Based on the information obtained from display unit 520, the user moves vehicle 10 in order to achieve positional relationship between power reception device 140 and power transmission device 20A that is favorable for power transmission and reception. It is to be noted that the user does not necessarily have to operate the handle or the accelerator, but vehicle 10 may automatically move to align its position, which may be observed on display unit 520 by the user. In addition, the user may be informed of the information by sound in place of display unit 520 visually informing the user of the information.

Again referring to FIG. 1, in charging station 90, power supply units 600A, 600B and 600C receive electric power from external power supply 950 such as a commercial system power supply, and generate AC power having a prescribed transmission frequency.

Each of power transmission units 700A, 700B and 700C includes a resonance circuit for transmitting electric power to power reception unit 100 of vehicle 10 in a contactless manner. The resonance circuit is formed of a coil and a capacitor. When a desired resonant condition is obtained only by a coil, a capacitor does not have to be provided. Then, power transmission units 700A, 700B and 700C receive AC power having a transmission frequency from power supply units 600A, 600B and 600C, respectively, and transmit the received AC power to power reception unit 100 of vehicle 10 in a contactless manner through the electromagnetic field generated around power transmission units 700A, 700B and 700C.

Filter circuits 610A, 610B and 610C are provided between power supply units 600A, 600B and 600C and power transmission units 700A, 700B and 700C, respectively, and suppress the harmonic noise generated from power supply units 600A, 600B and 600C, respectively. Filter circuits 610A, 610B and 610C each are formed of an LC filter including an inductor and a capacitor.

Power supply ECU 800 includes a CPU, a storage device, an input/output buffer, and the like (each of which is not shown). This power supply ECU 800 inputs the signals from various sensors and outputs the control signal to each device while controlling each device in charging station 90. By way of example, power supply ECU 800 carries out switching control of power supply units 600A, 600B and 600C such that power supply units 600A, 600B and 600C each generate AC power having a transmission frequency. It is to be noted that the above-described control is not limited to the process by software, but can be carried out by dedicated hardware (an electronic circuit).

Furthermore, as main control carried out by power supply ECU 800, power supply ECU 800 carries out electric power transmission control for adjusting the electric power to be transmitted to vehicle 10 to a prescribed target during charging of power storage device 300 by charging station 90. Specifically, power supply ECU 800 controls the power supply unit in the above-described power transmission device such that the transmission electric power to be output to vehicle 10 from the power transmission device having been identified by pairing becomes equal to the electric power transmission command received by communication unit 810.

Voltage sensor 612 detects the voltage of transmission electric power supplied to the power transmission unit, and outputs the detected value to power supply ECU 800. Current sensor 614 detects the current of transmission electric power supplied to the power transmission unit, and outputs the detected value to power supply ECU 800. Based on the detected values in voltage sensor 612 and current sensor 614, the transmission electric power output to vehicle 10 can be detected. It is to be noted that voltage sensor 612 and current sensor 614 may be provided between power supply unit 600A and filter circuit 610A.

Communication unit 810, which is configured to be capable of carrying out radio communication with communication unit 510 of vehicle 10, receives the electric power transmission command transmitted from vehicle 10, and also exchanges information including start/stop of power transmission, the power receiving conditions of vehicle 10 and the like with vehicle 10.

The AC power having a prescribed transmission frequency is supplied from power supply units 600A, 600B and 600C to power transmission units 700A, 700B and 700C through filter circuits 610A, 610B, and 610C, respectively. Each of power transmission units 700A, 700B and 700C and power reception unit 100 of vehicle 10 includes a coil and a capacitor, and is designed to resonate in a transmission frequency. It is preferable that a Q factor indicating the resonance strength of each of power transmission units 700A, 700B and 700C and power reception unit 100 is equal to or higher than 100.

When AC power is supplied from power supply units 600A, 600B and 600C to power transmission units 700A, 700B and 700C, respectively, energy (electric power) is transferred from one of power transmission units 700A, 700B and 700C to power reception unit 100 through the electromagnetic field formed between the coil of power reception unit 100 and the coil included in one of power transmission units 700A, 700B and 700C. Then, the energy (electric power) transferred to power reception unit 100 is supplied to power storage device 300 through filter circuit 150 and rectification unit 200.

Although not particularly shown, in power transmission devices 20A, 20B and 20C, an isolation transformer may be provided between power transmission units 700A, 700B and 700C and power supply units 600A, 600B and 600C (for example, between power transmission units 700A, 700B and 700C and filter circuits 610A, 610B and 610C), respectively. Furthermore, also in vehicle 10, an isolation transformer may be provided between power reception unit 100 and rectification unit 200 (for example, between power reception unit 100 and filter circuit 150).

(Configuration of Power Control System)

Figure 3:
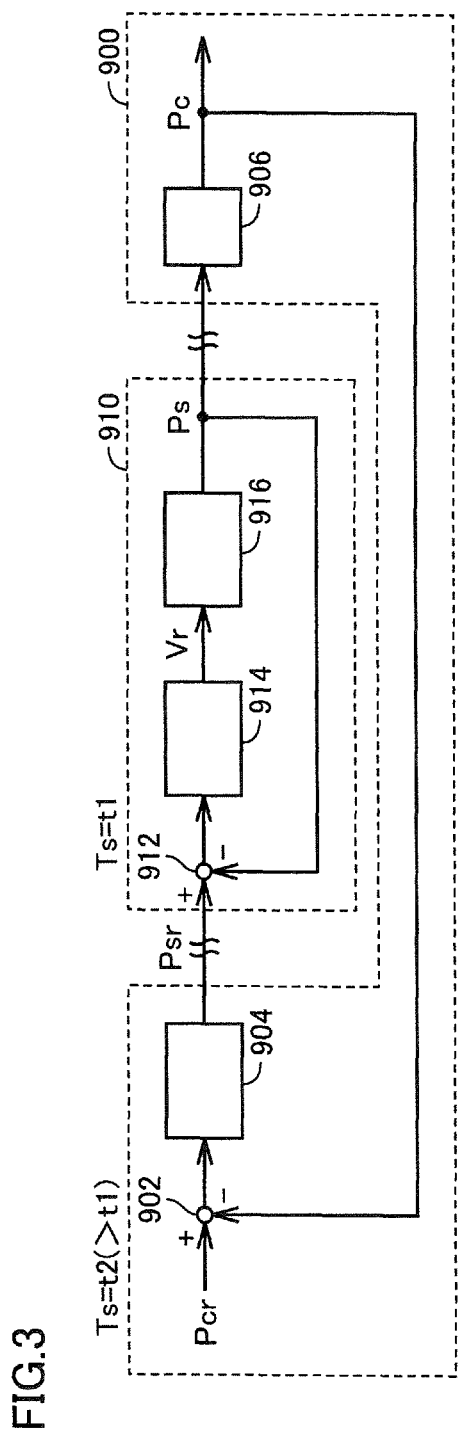
FIG. 3 is a control block diagram of power control carried out in the contactless power transfer system shown in FIG. 1.

FIG. 3 is a control block diagram of power control carried out in the contactless power transfer system shown in FIG. 1. Referring to FIG. 3, this control block includes subtraction units 902, 912, a vehicle-side controller 904, a power supply-side controller 914, an object to be controlled 916, and an efficiency element 906.

Subtraction unit 902 subtracts received electric power Pc, which can be detected, from an electric power reception command Pcr showing the target of the received electric power in vehicle 10, and outputs the calculated value to vehicle-side controller 904. It is to be noted that received electric power Pc can be calculated based on the detected values in voltage sensor 203 and current sensor 204 shown in FIG. 1.

Based on the deviation between electric power reception command Pcr and received electric power Pc, vehicle-side controller 904 generates an electric power transmission command Psr showing the target of transmission electric power Ps output from charging station 90. Vehicle-side controller 904, for example, carries out proportional-integral control (PI control) and the like using, as an input, the deviation between electric power reception command Pcr and received electric power Pc, thereby calculating an operation amount, and setting the calculated operation amount as electric power transmission command Psr. This electric power transmission command Psr is wirelessly transmitted by communication unit 510 (FIG. 1) from vehicle 10 to charging station 90.

Subtraction unit 912 subtracts transmission electric power Ps, which can be detected, from electric power transmission command Psr, and outputs the calculated value to power supply-side controller 914. It is to be noted that transmission electric power Ps can be calculated based on the detected values in voltage sensor 612 and current sensor 614 shown in FIG. 1.

Based on the deviation between electric power transmission command Psr and transmission electric power Ps, power supply-side controller 914 generates a voltage command value Vr of the power supply unit in the power transmission device that has been identified by pairing. Power supply-side controller 914, for example, carries out PI control and the like using, as an input, the deviation between electric power transmission command Psr and transmission electric power Ps, thereby calculating an operation amount, and setting the calculated operation amount as voltage command value Vr.

Object to be controlled 916 corresponds to the power transmission device that has been identified by pairing. The following is an explanation about the case where the power transmission device that has been identified by pairing corresponds to power transmission device 20A (FIG. 1). Specifically, voltage command value Vr calculated by power supply-side controller 914 is supplied to power supply unit 600A, and a voltage V in power supply unit 600A is controlled to be voltage command value Vr, thereby generating transmission electric power Ps. This transmission electric power Ps is transmitted from power transmission unit 700A to power reception unit 100 of vehicle 10 in a contactless manner, and received electric power Pc obtained in consideration of power receiving efficiency shown in efficiency element 906 is detected in vehicle 10.

In this control block diagram, the feedback control loop (major loop) formed by subtraction unit 902, vehicle-side controller 904 and efficiency element 906 forms an electric power reception control unit 900 that carries out electric power reception control for adjusting received electric power Pc to electric power reception command Pcr. Furthermore, the feedback control loop (minor loop) formed of subtraction unit 912, power supply-side controller 914 and object to be controlled 916 forms an electric power transmission control unit 910 that carries out electric power transmission control for adjusting transmission electric power Ps to electric power transmission command Psr.

Electric power reception control unit 900 is mounted in vehicle ECU 500. Electric power transmission control unit 910 is mounted in power supply ECU 800. Then, as described above, the responsiveness of the electric power reception control carried out in electric power reception control unit 900 is designed to be lower than the responsiveness of the electric power transmission control carried out in electric power transmission control unit 910. By way of example, a convergence time Ts is designed to be t1 for the electric power transmission control and designed to be t2 (t2>t1) for the electric power reception control.

In addition, as a parameter for designing responsiveness, a rise time, a time constant and the like may be used in place of convergence time Ts. Specifically, the time constant for the electric power reception control carried out in electric power reception control unit 900 is set greater than the time constant for the electric power transmission control carried out in electric power transmission control unit 910. Accordingly, as described above, the responsiveness of the electric power reception control carried out in electric power reception control unit 900 is lower than the responsiveness of the electric power transmission control carried out in electric power transmission control unit 910.

In addition, since the responsiveness of the electric power reception control is designed to be lower than the responsiveness of the electric power transmission control, it is preferable that the control cycle of feedback control (electric power reception control unit 900) constituting electric power reception control is longer than the control cycle of feedback control (electric power transmission control unit 910) constituting electric power transmission control.

Furthermore, it is preferable that the transmission cycle of electric power transmission command Psr transmitted from vehicle 10 to charging station 90 by communication unit 510 of vehicle 10 is longer than the control cycle of the electric power transmission control carried out in charging station 90. Furthermore, it is preferable that the transmission cycle of electric power transmission command Psr is the same as or longer than the control cycle of electric power reception control.

By designing the responsiveness as described above, if a communication failure occurring between communication units 510 and 810 during transmission of electric power transmission command Psr from electric power reception control unit 900 to electric power transmission control unit 910 is a short-time communication failure, it becomes possible to suppress an influence exerted by carrying out the electric power transmission control in the state where electric power transmission command Psr, which has been changed (updated) in electric power reception control unit 900, is not transmitted to electric power transmission control unit 910. In particular, in the case where a communication failure is resolved before electric power transmission command Psr is changed (updated) in electric power reception control unit 900, this communication failure does not exert an influence upon the electric power transmission control.

(Procedure of Contactless Power Transfer)

Figure 4:
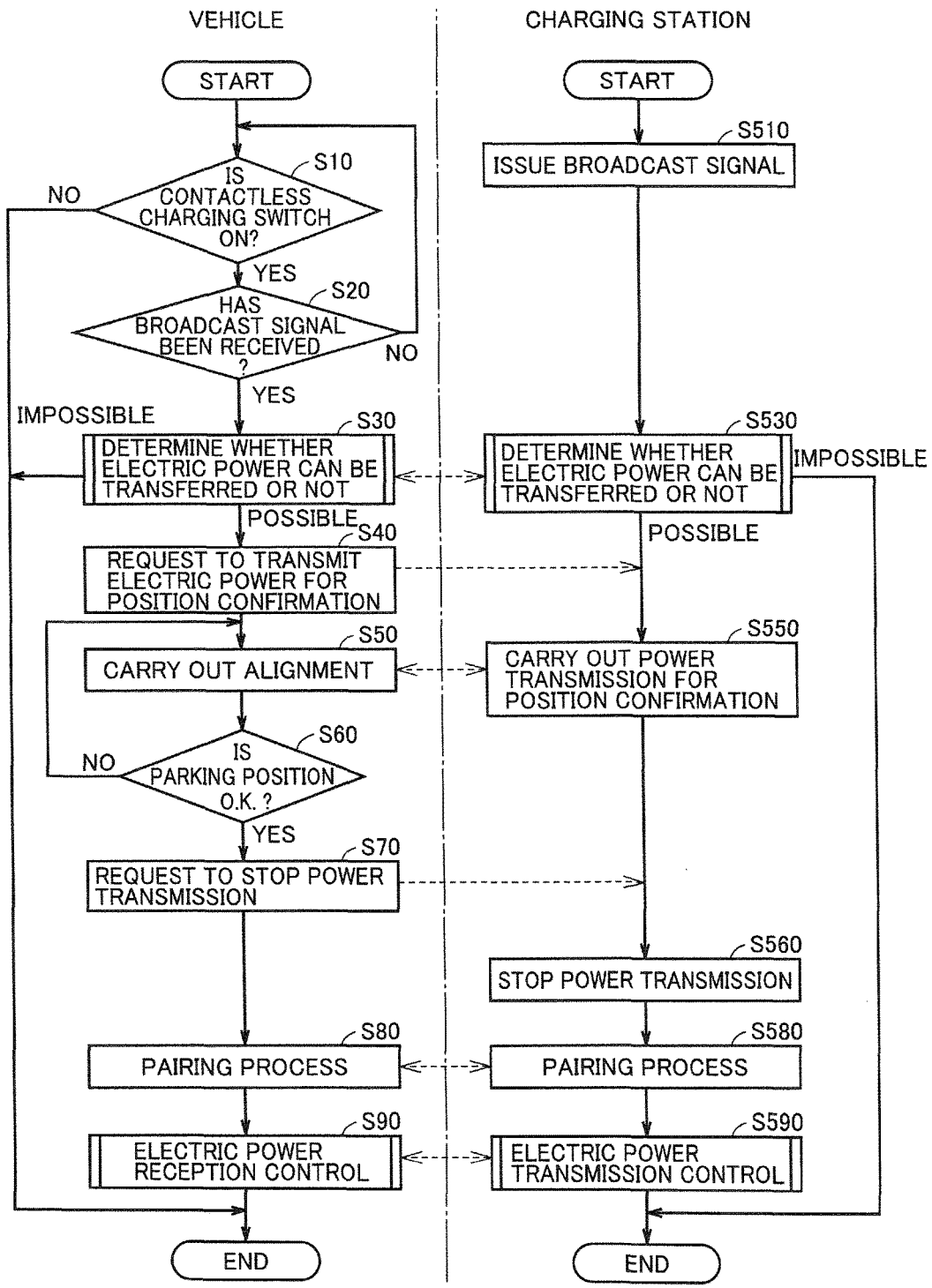
FIG. 4 is a flowchart for illustrating an outline of the process performed by the vehicle and the charging station at the time when contactless power transfer is carried out.

FIG. 4 is a flowchart for illustrating an outline of the process performed by vehicle 10 and charging station 90 at the time when contactless power transfer is carried out. FIG. 5 is a timing chart showing changes in the transmission electric power and the voltage of received electric power that change in the course of the process in FIG. 4.

Referring to FIGS. 1, 4 and 5, in charging station 90, when power supply ECU 800 determines based on the outputs from sensors 21A to 21C that at least one of parking spaces A to C is vacant, it issues a broadcast signal to the surroundings informing that charging station 90 can transmit electric power (step S510).

In vehicle 10, vehicle ECU 500 determines whether contactless charging switch 530 is "ON" or not (step S10). Contactless charging switch 530 is in the state of "ON" when it is not operated by the user, and turned "OFF" when it is operated by the user. When it is determined that contactless charging switch 530 is "OFF" (NO in step S10), vehicle ECU 500 ends the process without carrying out a series of subsequent processes.

When it is determined in step S10 that contactless charging switch 530 is "ON" (YES in step S10), vehicle ECU 500 determines whether or not a broadcast signal has been received from charging station 90 (step S20). When the broadcast signal has not been received (NO in step S20), the process is returned to step S10.

When the broadcast signal has been received in vehicle 10 (YES in step S20), vehicle ECU 500 of vehicle 10 and power supply ECU 800 of charging station 90 each carry out the determination process for determining whether electric power can be transferred from charging station 90 to vehicle 10 (steps S30, S530). This determination process will be described later.

When it is determined that electric power cannot be transferred from charging station 90 to vehicle 10, the process ends in vehicle 10 and charging station 90. On the other hand, when it is determined that electric power can be transferred from charging station 90 to vehicle 10, vehicle ECU 500 of vehicle 10 transmits, to charging station 90, the signal requesting an output of electric power for position confirmation (step S40).

When the above-described request signal is received in charging station 90, power supply ECU 800 controls power supply units 600A to 600C such that the electric power for position confirmation is output from the power transmission unit of the parking space in which a vehicle is not parked (step S550). When sensors 21A to 21C are not provided, power supply ECU 800 cannot recognize the parking space in which a vehicle is going to be parked. Accordingly, in this case, power supply ECU 800 controls power supply units 600A to 600C such that electric power for position confirmation is output from each of the power transmission units in the parking spaces in which full-scale power transmission for charging power storage device 300 is not carried out.

When electric power for position confirmation is received in vehicle 10, vehicle ECU 500 carries out alignment by automatically or manually moving vehicle 10 based on the voltage of received electric power (step S50) (see time t1 in FIG. 5). At the time of alignment, vehicle ECU 500 brings relay 202 into conduction and obtains the voltage of received electric power detected by voltage sensor 203. Since the voltage of received electric power at the time of this alignment is lower than the voltage of received electric power (charging voltage) at the time of full-scale power transmission for charging power storage device 300, relay 210 is turned off so as not to be influenced by power storage device 300 during voltage detection.

Then, when the voltage of received electric power exceeds a prescribed threshold value, display unit 520 displays that alignment has been completed. Then, when the user presses a parking switch provided within vehicle 10 to determine the parking position as being O.K. (YES in step S60), vehicle ECU 500 transmits, to charging station 90, a signal requesting to stop transmission of electric power for position confirmation (step S70) (see time t2 in FIG. 5).

When the above-described signal requesting to stop power transmission is received in charging station 90, power supply ECU 800 stops transmission of electric power for position confirmation from power transmission devices 20A, 20B and 20C (step S560) (see time t3 in FIG. 5).

With respect to fixed transmission electric power (electric power output from each of power transmission devices 20A, 20B and 20C), the voltage of received electric power in vehicle 10 changes in accordance with the distance between the coil of power reception device 140 and the coil of each of power transmission devices 20A, 20B and 20C. Thus, the relation between the voltage of received electric power and the difference of the position in the horizontal direction between core center O1 of the coil on the power transmission side and core center O2 of the coil on the power reception side is measured in advance. Then, the voltage of received electric power with respect to the tolerance of the difference of the position in the horizontal direction between core center O1 and core center O2 is set as a threshold value.

Then, vehicle ECU 500 and power supply ECU 800 each carry out the pairing process for identifying one of power transmission devices 20A, 20B and 20C with which alignment has been carried out (steps S80, S580). For each power transmission device, power supply ECU 800 changes the duration time during which electric power is transmitted (power transmission is ON). In other words, power transmission device 20A turns power transmission to be ON for time TA, power transmission device 20B turns power transmission to be ON for time TB, and power transmission device 20C turns power transmission to be ON for time TC (see time t4 in FIG. 5).

Then, vehicle ECU 500 notifies power supply ECU 800 about the duration time during which the electric power is received (power reception is ON). In the example of FIG. 2, power reception device 140 receives electric power transmitted from power transmission device 20A. Vehicle ECU 500 notifies power supply ECU 800 that the duration time during which power reception is ON is TA. Thereby, power supply ECU 800 recognizes that alignment with power transmission device 20A has been carried out.

When the pairing process is completed, power supply ECU 800 of charging station 90 carries out electric power transmission control for outputting electric power for charging power storage device 300 by the power transmission device with which alignment has been carried out and that has been identified by pairing (step S590) (time t6 in FIG. 5). On the other hand, in vehicle 10, vehicle ECU 500 carries out electric power reception control for causing power reception device 140 to receive the electric power for charging power storage device 300, and then, power storage device 300 is charged with the received electric power (step S90). Then, charging of power storage device 300 is completed, the process in each of vehicle 10 and charging station 90 ends.

(Determination as to Whether Electric Power can be Transferred or not)

Figure 6:
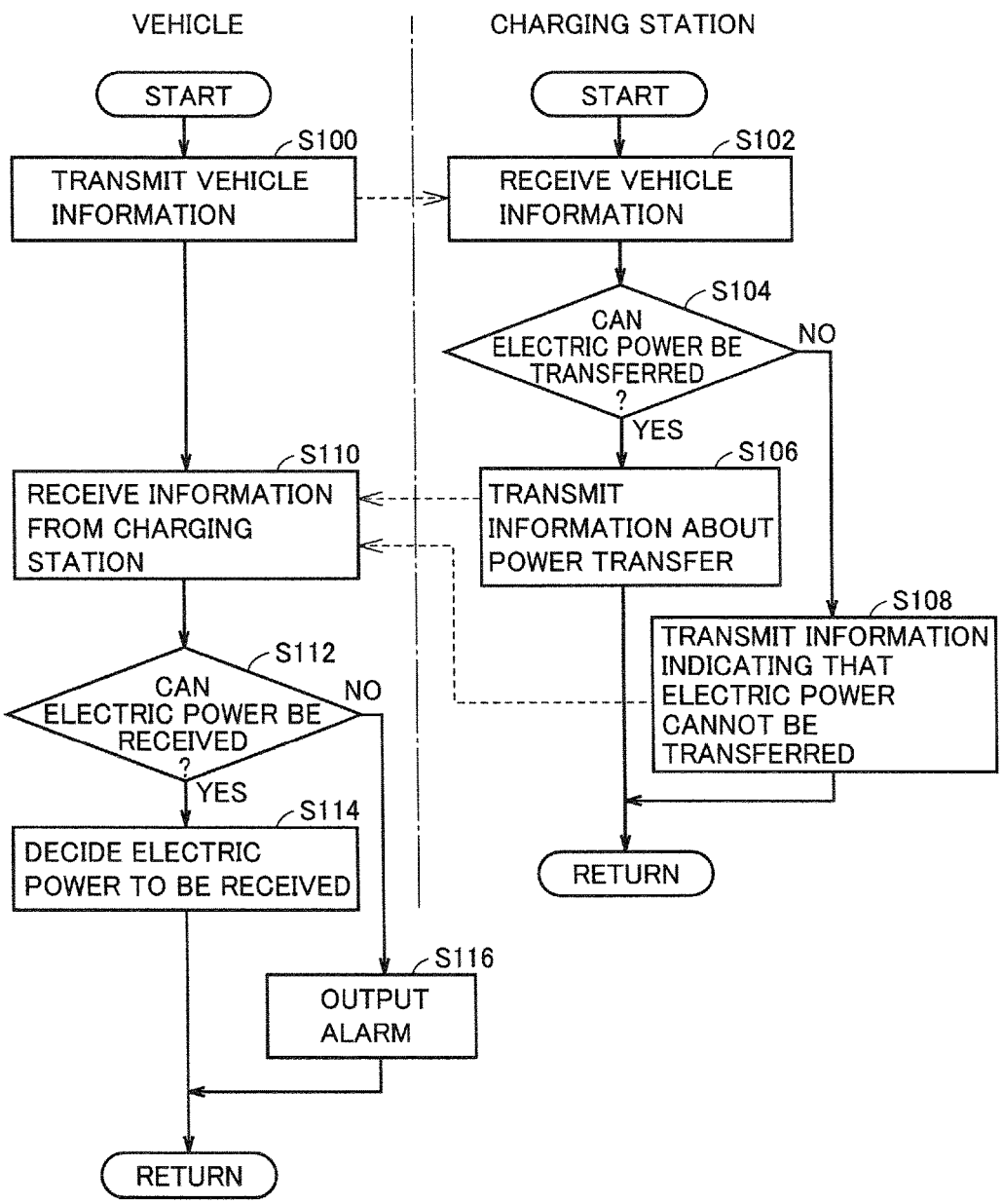
FIG. 6 is a flowchart illustrating the process of determining whether power transfer can be carried out or not, which is performed in steps S30 and S530 shown in FIG. 4.

FIG. 6 is a flowchart illustrating the process of determining whether power transfer can be carried out or not, which is performed in steps S30 and S530 shown in FIG. 4. Referring to FIG. 6, vehicle ECU 500 transmits the information about vehicle 10 (vehicle information) to charging station 90 (step S100). This vehicle information may, for example, include information such as the coil type, the coil size and the like of power reception unit 100.

When the vehicle information is received in charging station 90 (step S102), power supply ECU 800 determines based on the received vehicle information whether or not electric power can be transferred from charging station 90 to vehicle 10 (step S104). Specifically, based on whether or not the coil type of power reception unit 100 is such a coil type as being capable of receiving electric power from power transmission units 700A to 700C, based on whether the coil size of power reception unit 100 is an appropriate size or not, and the like, it is determined whether electric power can be transferred from charging station 90 to vehicle 10.

When it is determined in step S104 that electric power can be transferred from charging station 90 to vehicle 10 (YES in step S104), power supply ECU 800 transmits, to vehicle 10, the information about power transfer from charging station 90 to vehicle 10 (step S106). It is to be noted that this information includes information and the like about the range in which electric power can be output from charging station 90, for example.

In addition, when it is determined in step S104 that electric power cannot be transferred from charging station 90 to vehicle 10 (NO in step S104), power supply ECU 800 transmits, to vehicle 10, the information indicating that electric power cannot be transferred (step S108).

In vehicle 10, when the information (information about power transfer or the information indicating that electric power cannot be transferred) is received from charging station 90 (step S110), vehicle ECU 500 determines based on the received information whether or not electric power can be received from charging station 90 (step S112). Then, when it is determined that electric power can be received (YES in step S112), vehicle ECU 500 decides the magnitude of the electric power received from charging station 90 (step S114). In addition, when it is determined in step S112 that electric power cannot be received (NO in step S112), the alarm notifying that electric power cannot be received is output (step S116).

Figure 7:
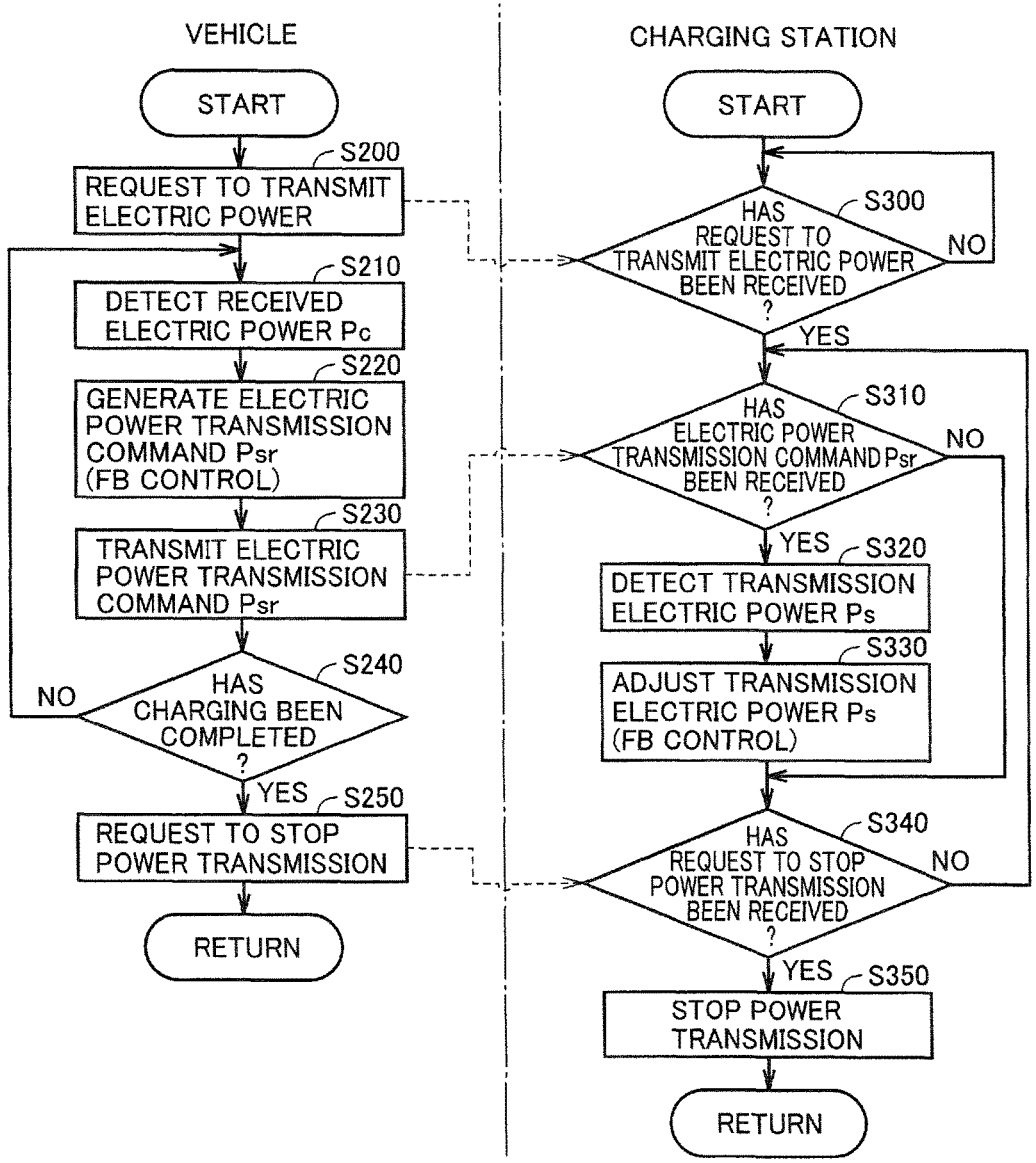
FIG. 7 is a flowchart illustrating the procedure of the processes for electric power reception control carried out in step S90 and electric power transmission control carried out in step S590, each of which is shown in FIG. 4.

FIG. 7 is a flowchart illustrating the procedure of the processes for electric power reception control carried out in step S90 and electric power transmission control carried out in step S590, each of which is shown in FIG. 4. Referring to FIG. 7, in vehicle 10, vehicle ECU 500 causes communication unit 510 to transmit, to charging station 90, a signal requesting power transmission from charging station 90 to vehicle 10 (step S200).

When power transmission from charging station 90 to vehicle 10 is started in response to the request for power transmission, vehicle ECU 500 detects received electric power Pc (step S210). Received electric power Pc is calculated based on each of detected values in voltage sensor 203 and current sensor 204 (FIG. 1).

Then, vehicle ECU 500 generates electric power transmission command Psr based on received electric power Pc that has been detected and electric power reception command Pcr (step S220). Specifically, vehicle ECU 500 carries out feedback control using, as an input, the deviation between received electric power Pc and electric power reception command Pcr, thereby generating electric power transmission command Psr. Then, vehicle ECU 500 causes communication unit 510 to transmit the generated electric power transmission command Psr to charging station 90 (step S230).

Then, vehicle ECU 500 determines whether charging of power storage device 300 has completed or not (step S240). For example, when the SOC (State Of Charge) of power storage device 300 reaches a fully-charged state or contactless charging switch 530 is turned "OFF", it is determined that charging has been completed. If charging has not been completed (NO in step S240), the process is returned to step S210.

When it is determined in step S240 that charging has been completed (YES in step S240), vehicle ECU 500 causes communication unit 510 to transmit, to charging station 90, a signal requesting to stop power transmission from charging station 90 to vehicle 10 (step S250). Thereby, power transmission from charging station 90 to vehicle 10 is stopped.

On the other hand, in charging station 90, when power supply ECU 800 causes communication unit 810 to receive the request for power transmission from vehicle 10 (YES in step S300), it starts power transmission to vehicle 10. Power supply ECU 800 determines whether electric power transmission command Psr from vehicle 10 has been received by communication unit 810 (step S310). When electric power transmission command Psr has not been received (NO in step S310), the process proceeds to step S340.

When electric power transmission command Psr has been received by communication unit 810 (YES in step S310), power supply ECU 800 detects transmission electric power Ps in the power transmission device that has been identified by pairing (step S320). Transmission electric power Ps is calculated based on each of detected values in voltage sensor 612 and current sensor 614 (FIG. 1).

Then, power supply ECU 800 adjusts transmission electric power Ps by controlling the power supply unit in the above-described power transmission device such that the detected transmission electric power Ps becomes equal to electric power transmission command Psr (step S330). Specifically, power supply ECU 800 adjusts transmission electric power Ps by carrying out feedback control using, as an input, the deviation between transmission electric power Ps and electric power transmission command Psr.

Then, power supply ECU 800 determines whether or not the request to stop power transmission has been received from vehicle 10 (step S340). When the request to stop power transmission has not been received (NO in step S340), the process is returned to step S310. On the other hand, when the request to stop power transmission has been received (YES in step S340), power supply ECU 800 controls the power transmission device so as to stop power transmission to vehicle 10 (step S350).

As described above, according to this first embodiment, the responsiveness of the electric power reception control carried out in electric power reception control unit 900 (FIG. 3) is lower than the responsiveness of the electric power transmission control carried out in electric power transmission control unit 910 (FIG. 3). Accordingly, if the communication failure occurring between communication units 510 and 810 is a short-time communication failure, the electric power transmission control is less influenced by the fact that the update value of electric power transmission command Psr generated by electric power transmission control unit 910 is not transmitted to electric power reception control unit 900. If the electric power transmission control is less influenced, power transfer from charging station 90 to vehicle 10 does not have to be stopped. Therefore, according to this first embodiment, it becomes possible to suppress that power transfer is stopped by the communication failure occurring between charging station 90 and vehicle 10.

Second Embodiment

In the above-described first embodiment, the responsiveness of the electric power transmission control carried out in power supply ECU 800 of charging station 90 is designed, for example, in accordance with the convergence time of the step response. However, in consideration of the control stability in the case where the changed amount of electric power transmission command Psr is increased, the responsiveness of the electric power reception control of the major loop has to be designed to be significantly low with respect to the responsiveness of the electric power transmission control of the minor loop (for example, approximately 1/10 of electric power transmission control).

According to this second embodiment, in power supply ECU 800 in which electric power transmission control is carried out, it is determined whether or not transmission electric power Ps has converged to electric power transmission command Psr. Then, a convergence flag indicating that transmission electric power Ps has converged is transmitted from charging station 90 to vehicle 10. Then, when vehicle 10 receives the convergence flag from charging station 90, it becomes possible to change electric power transmission command Psr based on the electric power reception control. This eliminates the need to design the responsiveness of the electric power reception control of the major loop to be sufficiently low with respect to the responsiveness of the electric power transmission control of the minor loop. Thus, it can be expected to improve the responsiveness as the entire control system.

The entire configuration of the contactless power transfer system and the entire configuration of charging station 90 and vehicle 10 in this second embodiment are the same as the configuration illustrated in the first embodiment shown in FIGS. 1 and 2.

Figure 8:
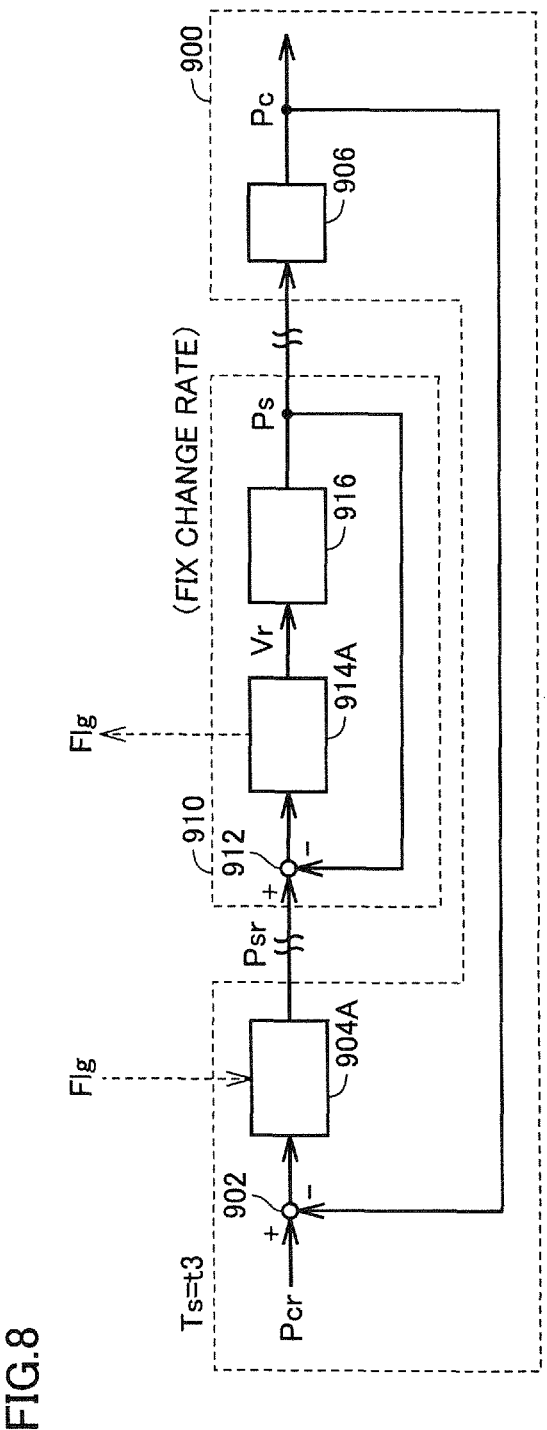
FIG. 8 is a control block diagram of power control carried out in a contactless power transfer system in the second embodiment.

FIG. 8 is a control block diagram of power control carried out in a contactless power transfer system in the second embodiment. Referring to FIG. 8, this control block includes a power supply-side controller 914A and a vehicle-side controller 904A in place of power supply-side controller 914 and vehicle-side controller 904, respectively, in the control block diagram according to the first embodiment shown in FIG. 3.

Power supply-side controller 914A is the same as power supply-side controller 914 in the first embodiment in the point that voltage command value Vr is generated based on the deviation between electric power transmission command Psr and transmission electric power Ps. On the other hand, in power supply-side controller 914, for example, the responsiveness of electric power transmission control is designed such that the convergence time of electric power transmission control is equal to or less than a prescribed time period. In contrast, in power supply-side controller 914A, the upper limit of the change rate of transmission electric power Ps is designed based on the operation characteristics of object to be controlled 916 (for example, 1 kW/second). Then, power supply-side controller 914A determines whether or not transmission electric power Ps has converged to electric power transmission command Psr. When power supply-side controller 914A determines that transmission electric power Ps has converged to electric power transmission command Psr, it generates a convergence flag Flg and transmits the flag to vehicle 10.

Vehicle-side controller 904A is the same as vehicle-side controller 904 in the first embodiment in the point that electric power transmission command Psr is generated based on the deviation between electric power reception command Pcr and received electric power Pc. On the other hand, in vehicle-side controller 904A, the responsiveness of the electric power reception control is designed such that convergence time Ts is set to be t3, for example. This responsiveness is designed to be lower than the responsiveness of the electric power transmission control carried out in power supply-side controller 914A, but higher than that in vehicle-side controller 904 in the first embodiment.

Then, when vehicle-side controller 904A receives, from charging station 90, convergence flag Flg indicating that transmission electric power Ps has converged to electric power transmission command Psr, it generates electric power transmission command Psr and transmits the command to charging station 90. Vehicle-side controller 904A may be configured to generate electric power transmission command Psr irrespective of whether convergence flag Flg has been received or not, and transmit the generated electric power transmission command Psr to charging station 90 when it receives convergence flag Flg.

In this second embodiment, electric power transmission command Psr is changed in electric power reception control after convergence of electric power transmission control is confirmed. Accordingly, it is not necessary to design the responsiveness of electric power reception control to be uniformly low in consideration of the control stability in the case where the changed amount of electric power transmission command Psr is increased. Thus, the responsiveness of the entire control system can be improved as compared with the first embodiment.

Figure 9:
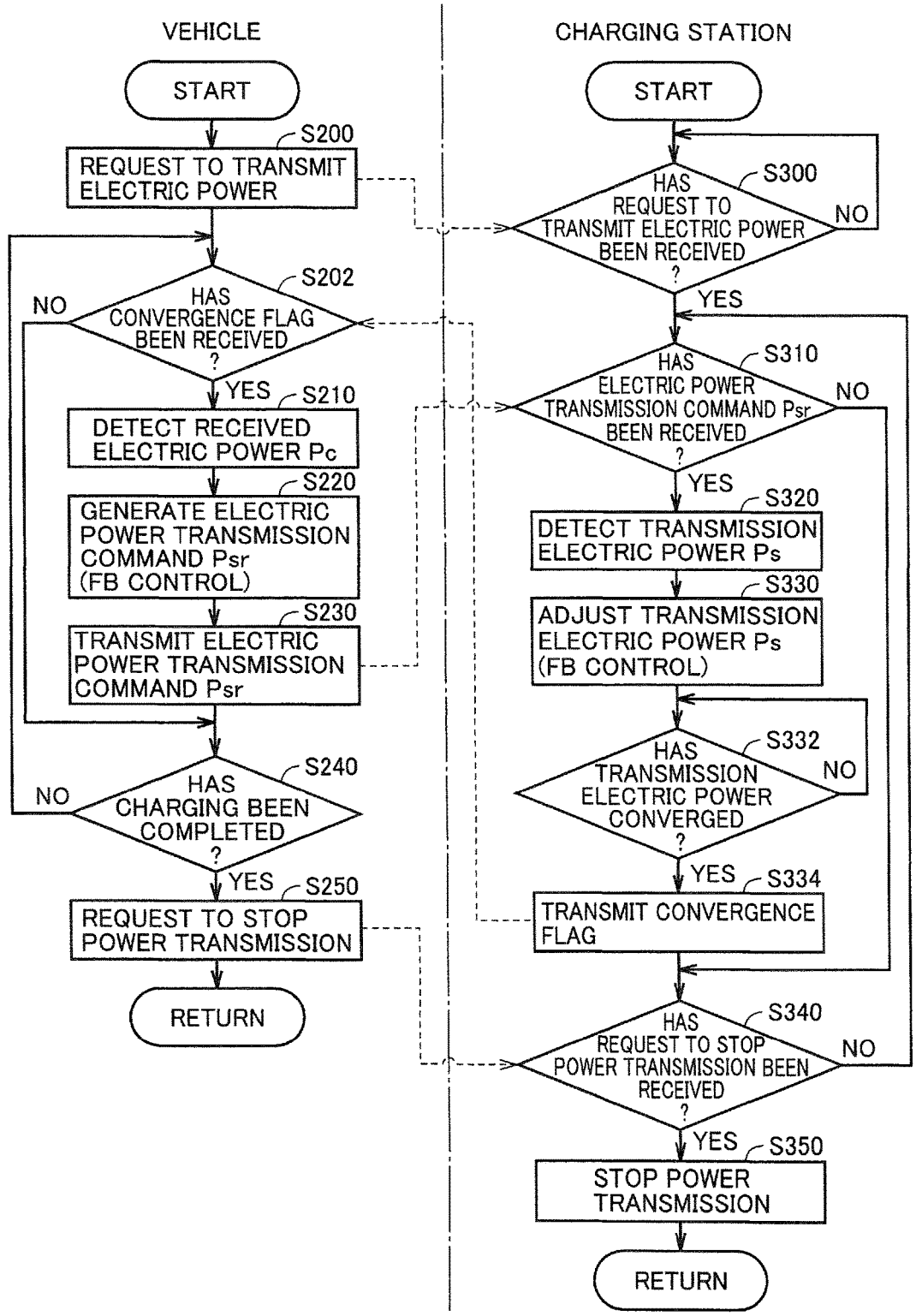
FIG. 9 is a flowchart illustrating the procedure of the processes for electric power reception control and electric power transmission control carried out in the second embodiment.

FIG. 9 is a flowchart illustrating the procedure of the processes for electric power reception control and electric power transmission control carried out in the second embodiment. Referring to FIG. 9, this flowchart additionally includes steps S202, S332 and S334 in the flowchart shown in FIG. 7.

Specifically, in charging station 90, when transmission electric power Ps is adjusted in step S330, power supply ECU 800 determines whether or not transmission electric power Ps has converged to electric power transmission command Psr (step S332). For example, when the steady-state deviation of transmission electric power Ps with respect to electric power transmission command Psr is equal to or less than several % of electric power transmission command Psr, it is determined that transmission electric power Ps has converged to electric power transmission command Psr.

When it is determined that transmission electric power Ps has converged to electric power transmission command Psr (YES in step S332), power supply ECU 800 generates convergence flag Flg, and causes communication unit 810 to transmit the flag to vehicle 10 (step S334). Then, the process proceeds to step S340.

On the other hand, in vehicle 10, when the request for power transmission is transmitted to charging station 90 in step S200, vehicle ECU 500 determines whether or not convergence flag Flg has been received from charging station 90 (step S202). Then, when convergence flag Flg has been received (YES in step S202), the process proceeds to step S210, and electric power transmission command Psr based on the electric power reception control is generated and transmitted to charging station 90.

When reception of convergence flag Flg is not confirmed in step S202 (NO in step S202), the process proceeds to step S240, and electric power transmission command Psr is not transmitted to charging station 90.

In the above description, convergence flag Flg is transmitted from charging station 90 to vehicle 10, and it is determined in vehicle 10 whether generation or transmission of electric power transmission command Psr is required or not. In vehicle 10, however, electric power transmission command Psr is calculated and updated continuously in each prescribed cycle, and transmitted to charging station 90. When transmission electric power Ps has not converged, charging station 90 may be configured not to receive electric power transmission command Psr. Alternatively, in the case where electric power transmission command Psr is received in charging station 90 but transmission electric power Ps has not converged, changing of electric power transmission command Psr in the electric power transmission control may be stopped (inhibited).

As described above, in this second embodiment, after checking on the vehicle side that transmission electric power Ps has converged to electric power transmission command Psr, electric power transmission command Psr transmitted from vehicle 10 to charging station 90 is updated. Accordingly, it is not necessary to uniformly lower the responsiveness of the electric power reception control in consideration of the convergence of electric power transmission control obtained in the case where the changed amount of electric power transmission command Psr is relatively large. Therefore, according to this second embodiment, the responsiveness of electric power reception control can be improved while ensuring the stability of the entire electric power control.

Modification

In this modification, a modification of the pairing process will be described.

FIG. 10 is a diagram for illustrating a modification of the pairing process. Referring to FIG. 10, power supply ECU 800 changes the cycle of switching the transmission electric power to be transmitted or not (power transmission to be ON or OFF) for each power transmission device. In other words, power transmission device 20A switches the power transmission to be ON or OFF for each cycle dTA; power transmission device 20B switches the power transmission to be ON or OFF for each cycle dTB, and power transmission device 20C switches the power transmission to be ON or OFF for each cycle dTC (see time t4 to time t5 in FIG. 10).

Vehicle ECU 500 notifies power supply ECU 800 about the switching cycle of the received electric power (power reception to be ON or OFF). In the example of FIG. 10, power reception device 140 receives electric power transmitted from power transmission device 20A. Vehicle ECU 500 notifies power supply ECU 800 that the power reception ON/OFF switching cycle is dTA. This allows power supply ECU 800 to recognize that alignment with power transmission device 20A has been carried out (see time t5 in FIG. 10).

Although pairing is performed using transmission electric power in this modification, the method of the pairing process is not limited thereto. Pairing can be performed by using various kinds of techniques. For example, using the RFID (Radio Frequency IDentification) technique, pairing may be performed in the state where an RFID tag and an RFID leader are provided in the vehicle and the power transmission unit, respectively.

In each embodiment and modification as described above, it is determined in charging station 90 whether power transfer can be carried out or not (step S104 in FIG. 6). It may however be determined in vehicle 10 whether power transfer can be carried out or not.

In the above description, power supply ECU 800 corresponds to one embodiment of the "first control device" in the present invention; and communication unit 810 corresponds to one embodiment of the "first communication device" in the present invention. Furthermore, vehicle ECU 500 corresponds to one embodiment of the "second control device" in the present invention; and communication unit 510 corresponds to one embodiment of the "second communication device" in the present invention.

It should be construed that embodiments disclosed herein are by way of illustration in all respects, not by way of limitation. The scope of the present invention is defined by the terms of the claims, rather than the description of the embodiments provided above, and is intended to include any modifications within the meaning and scope equivalent to the terms of the claims.

REFERENCE SIGNS LIST

10 vehicle, 20A, 20B, 20C, power transmission device, 21A, 21B, 21C sensor, 90 charging station, 100 power reception unit, 140 power reception device, 150, 610A, 610B, 610C filter circuit, 200 rectification unit, 201 resistance, 202, 210, 310 relay, 203, 612 voltage sensor, 204, 614 current sensor, 300 power storage device, 400 motive power generation device, 500 vehicle ECU, 510, 810 communication unit, 520 display units, 530 contactless charging switch, 600A, 600B, 600C power supply unit, 700A, 700B, 700C power transmission unit, 800 power supply ECU, 900 electric power reception control unit, 902, 912 subtraction unit, 904, 904A vehicle-side controller, 906 efficiency element, 910 electric power transmission control unit, 914, 914A power supply-side controller, 916 object to be controlled, 950 external power supply.

The invention claimed is:

1. A contactless power transfer system comprising:
a charging station; and
a vehicle configured to receive electric power from said charging station in a contactless manner,
said charging station including
a power transmission device configured to transmit electric power to said vehicle in a contactless manner,
a first control device configured to control said power transmission device, and
a first communication device configured to communicate with said vehicle,
said vehicle including
a power reception device configured to receive, in a contactless manner, electric power output from said power transmission device,
a second control device configured to control said power reception device, and
a second communication device configured to communicate with said charging station,
said second control device generating an electric power transmission command for adjusting an amount of received electric power in said power reception device to a prescribed target, and causing said second communication device to transmit the electric power transmission command to said charging station,
said first control device controlling said power transmission device so as to adjust transmission electric power output from said power transmission device to said electric power transmission command received by said first communication device, and
response time of electric power reception control, which is carried out by said second control device, for adjusting said amount of received electric power being lower than response time of electric power transmission control, which is carried out by said first control device, for adjusting said transmission electric power.

2. The contactless power transfer system according to claim 1, wherein
said first control device carries out first feedback control based on a detected value of said transmission electric power,
said second control device carries out second feedback control based on a detected value of said amount of received electric power, and
said second feedback control is longer in control cycle time than said first feedback control.

3. The contactless power transfer system according to claim 1, wherein a time constant of said electric power reception control carried out by said second control device is greater than a time constant of said electric power transmission control carried out by said first control device.

4. The contactless power transfer system according to claim 1, wherein a transmission cycle time of said electric power transmission command transmitted by said second communication device is longer than a control cycle time of said electric power transmission control carried out by said first control device.

5. The contactless power transfer system according to claim 1, wherein
said first control device causes said first communication device to transmit, to said vehicle, a signal indicating that said transmission electric power has converged to said electric power transmission command, and
when said signal has been received by said second communication device, said second control device updates said electric power transmission command transmitted to said charging station by said second communication device.

6. The contactless power transfer system according to claim 1, wherein
said second control device updates, for each prescribed cycle, said electric power transmission command transmitted to said charging station by said second communication device, and
said first control device stops changing of said electric power transmission command in said electric power transmission control until said transmission electric power converges to said electric power transmission command.

7. A method of controlling a contactless power transfer system in which electric power is transferred from a charging station to a vehicle in a contactless manner, said method comprising the steps of:
generating an electric power transmission command for adjusting an amount of received electric power in said vehicle to a prescribed target, and transmitting the electric power transmission command from said vehicle to said charging station; and adjusting, in said charging station, transmission electric power output to said vehicle to said electric power transmission command received from said vehicle, response time of electric power reception control for adjusting said amount of received electric power is lower than response time of electric power transmission control for adjusting said transmission electric power.

\* \* \* \* \*